(12) United States Patent
Paclat

(10) Patent No.: US 6,847,963 B1
(45) Date of Patent: Jan. 25, 2005

(54) METHOD AND SYSTEM FOR APPENDING SEARCH STRINGS WITH USER PROFILE QUALITIES

(75) Inventor: Charles Paclat, Medford, MA (US)

(73) Assignee: BEA Systems, Inc., San Jose, CA (US)

(*) Notice: Subject to any disclaimer, the term of this patent is extended or adjusted under 35 U.S.C. 154(b) by 491 days.

(21) Appl. No.: 09/689,426

(22) Filed: Oct. 12, 2000

Related U.S. Application Data
(60) Provisional application No. 60/156,758, filed on Oct. 12, 1999.

(51) Int. Cl.[7] .............................................. G06F 17/30
(52) U.S. Cl. ................................. 707/5; 707/3; 707/10; 709/203; 709/219; 709/229
(58) Field of Search ..................... 705/26, 27; 709/203, 709/219, 229; 707/5, 3, 10

(56) References Cited

U.S. PATENT DOCUMENTS

| | | | |
|---|---|---|---|
| 5,740,549 A | | 4/1998 | Reilly et al. |
| 5,754,939 A | | 5/1998 | Herz et al. |
| 5,918,014 A | | 6/1999 | Robinson |
| 6,009,410 A | | 12/1999 | LeMole et al. |
| 6,327,590 B1 | * | 12/2001 | Chidlovskii et al. ........... 707/5 |
| 6,505,202 B1 | * | 1/2003 | Mosquera et al. ............ 707/10 |
| 6,507,841 B2 | * | 1/2003 | Rivereiulx de Varax ....... 707/5 |
| 2002/0091661 A1 | * | 7/2002 | Anick et al. ................... 707/1 |

FOREIGN PATENT DOCUMENTS

| | | |
|---|---|---|
| GB | 2341700 | 3/2000 |
| WO | WO 99/26127 | 5/1999 |

OTHER PUBLICATIONS

Sullivan, Danny, Intro to search engine submission, Search-enginewatch.com, dated Oct. 14, 2002.*
Berry et al., *Business Week*, 3388:56 (Sep. 5, 1994).
Loeb, *Communication of the ACM*, 35:2:39–48 (Dec. 1992).
Sheth et al., *Proc. of the 9th IEEE Conference on Artificial Intellignce for Applications*, 345–351 (Dec. 1993).
Morita, *Proc. of the 17th International Conference on Research and Development in Information Retrieval SIGR*, 272–281 (Jul. 1994).

* cited by examiner

Primary Examiner—Jeffrey A. Smith
Assistant Examiner—Mark Fadok
(74) Attorney, Agent, or Firm—Fulbright & Jaworski LLP

(57) ABSTRACT

A system and method is provided which allows item searches based on the qualities of the items. Additionally, the system suggests items to a customer or user based on his/her profile information that is learned by the system over time. That is, the system learns about a customer's preferences and stores that information.

14 Claims, 2 Drawing Sheets

METHOD AND SYSTEM FOR APPENDING SEARCH STRINGS WITH USER PROFILE QUALITIES

RELATED APPLICATION

This application is a continuation-in-part of U.S Provisional Application Ser. No. 60/158,758 filed Oct. 12, 1999.

BACKGROUND OF THE INVENTION

A key part of most electronic commerce solutions involves the ability to quickly locate products and services and tailor content to each individual user or customer. This requires both product indexing and user profiling.

There are many search engines and knowledge management tools, but none of these are built using the Enterprise Java Beans architecture. The present invention provides a mechanism by which a searchable product inventory can be matched with a customer's preference. It does so in a way that is simple for the programmer, scalable in design, and built upon an open systems architecture.

Normally search engines require a large amount of memory space to execute efficiently. This algorithm is designed to take advantage of the object caching built into the underlying platform such that it has a smaller footprint.

Normally search engines count the number of instances of words in html documents and then cross reference, by word count so that documents with the most number of word matches can be quickly found. The Advisor indexes the items in the various catalogs and makes them searchable by quality strings.

The present insertion has combined these two mechanisms into a single integrated solution called the Advisor or the Shopping Advisor component, which can be part of a suite of Enterprise Java Beans components that enable the rapid deployment of eCommerce Web Sites. For example, other components in the suite can provide support for the management of user sessions and creation of customer orders.

OBJECTS AND SUMMARY OF THE INVENTION

Therefore, it is an object of the present invention is to provide an Advisor, which generates a reverse index of items based on their qualities. This index allows the Advisor of the present invention to efficiently locate items with respect to the specified search criteria.

It is another object of the present invention to provide the Advisor as aforesaid, which emphasizes the indexing of objects rather than specific html documents.

It is a further object of the present invention to provide the Advisor as aforesaid, which is implemented using industry standard architecture, such as EJB, thereby enable the present invention to take advantage of the features of the underlying system architecture.

It is still further object of the present invention to provide the Advisor as aforesaid, which personalizes customer's shopping experience, suggests products and services based on customer profiles and buying patterns. That is, the Advisor of the present invention learns the profile of customer, thereby permitting accurate targeting of the offerings to the customer.

Various other objects, advantages and features of this invention will become readily apparent from the ensuing detailed description and the appended claim.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF THE INVENTION

Figure 1:
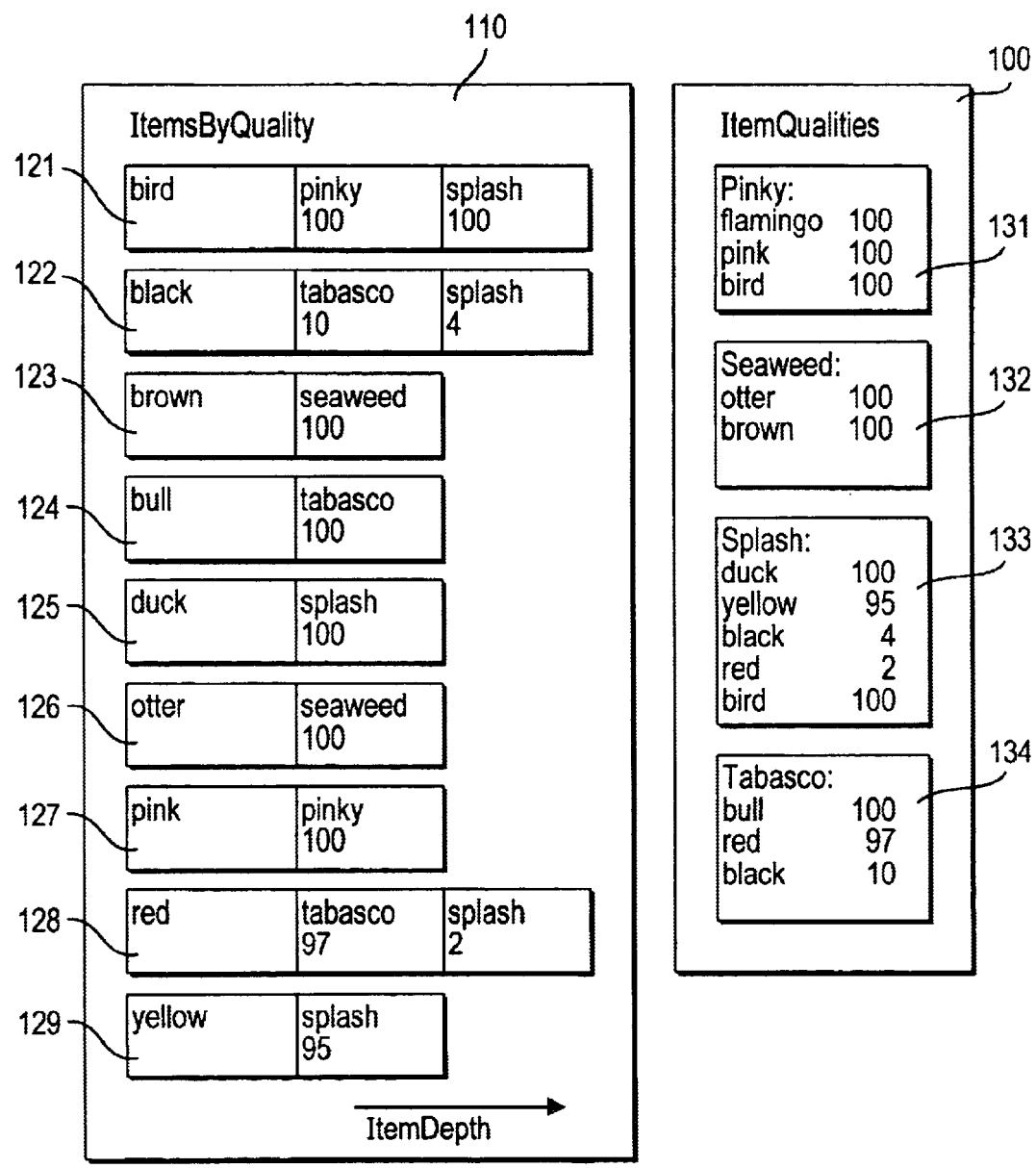
FIG. 1 illustrates the process by which an Advisor of the present invention performs a search.

The Advisor is divided into two components; a searchable inventory, and a customer profile. The searchable inventory is based on the Enterprise Java Beans Specification, 1.0 which is incorporated herein in its entirety built on the Enterprise Java Beans software architecture. The Advisor of the present invention builds an index that is automatically cached when specific qualities are being requested from and searched for in the searchable database. The programmer of the system can explicitly define the qualities of an item or provide a textual description that is parsed into a set of qualities. A quality is defined to be a string and a ranking, or degree. The qualities are "stemmed" and common words are discarded. Stemming is defined to be the process of reducing a word to a common form that is independent of tense. The user then adds the items to the Advisor, which causes the Advisor to create a reverse index of the items based on the qualities specified. That is, the items are stored sorted in descending order based on the ranking provided. Searching is accomplished by taking a sampling of the items that are associated with each quality. Each time an item is matched the degree to which it matches that quality is added to its overall score. Upon completion of the sampling, the list is reordered in accordance with the total number of qualities matched and the overall score. The search is configured by specifying the total number of qualities to be searched (referred to herein as quality depth), the total number of items sampled in each quality (referred to herein as item depth), the total number of suggestions to be returned, and if items must match all or some of the qualities requested.

The customer profile is created by keeping a running total of the qualities being searched for, the qualities of the items for which related items are requested, and the qualities of items that are actually purchased.

This product indexing in the Advisor is implemented as a reverse index on the qualities of the objects being categorized. It implements a unique approach to sampling the index and returning a result that closely matches the search criteria. The Advisor is built on top of the Enterprise Java Beans (EJB) industry standard and is designed to take advantage of its approach to distributed object transaction services. This makes the search algorithm simpler, more portable, and very space efficient.

The indexing and search mechanism further takes advantage of advanced Natural Language Processing technology. When objects are categorized, the Advisor will parse the textual description of the object and extract key words. These keywords are then normalized using a stemmer.

The user profiling is based on learning over time by averaging in information that is specified while searching and browsing. It can be used as the basis for locating a variety of contents. This can include product as well as other object types including advertising banners, securities, documents and image data. This tight integration between the search and the customer profile provides unique opportunities for creating very accurate matching of user preferences.

Finally, the Advisor is built using a powerful object oriented design methodologies that enables the creation of business components by the user. The user models the components using a UML modeling tool, such as Rational Rose® from Rational Software Corporation, and the Advisor of the present invention generates the requisite java source code that implements the modeled components. UML (Unified Modeling Language) is a general-purpose notational language for specifying and visualizing complex software, especially large, object-oriented projects. Accordingly, the Advisor of the present invention is extensible, customizable, and configurable. Unlike most search products that are standalone and oriented towards documents, the Advisor is designed to work on heterogeneous objects of any type. By extending the Advisor, its behavior can be adapted to apply additional constraints on the input parameters and the result sets. Extending the Advisor involves using the Smart Generator as described in pending U.S. Provisional Patent Application entitled "Smart Generator" filed Oct. 10, 2000, which is incorporated herein in its entirety, to create a derived class of the Advisor that modifies its behavior, by overriding one of its methods or extending it to include new methods.

All of these features together make the Advisor the most powerful search and profiling engine available.

Indexing and Searching

Turning now to FIG. 1, there is illustrated an example where a collection of stuffed animals are indexed based on the type of the animal and its color. The items 131–134 and their qualities, ItemQualities 100, are shown on the right. The reverse index, ItemsByQuality 110, is shown on the left and consists of each quality and the list of items associated with it. The items 121–129 in the collection of ItemsByQuality 110 are ranked in descending order based on the "degree" to which they possess a particular quality.

The simplest search involves a search based on a single quality, wherein the requested or desired quality is located in the collection of ItemsByQuality 110. The items matching the desired quality are then gathered into a list of suggestions and returned to the requester or caller ("user"). The Advisor scores each item on the list of suggestions based on the total number of qualities matched and the accumulation of degrees. For example, if the user searches for something "red," then the Advisor will return "Tabasco (1,97)" and "Splash (1,2)," wherein the results are represented by the notation: Item (number of qualities matched, accumulation of degrees). Although, both results matched the single search criteria, the result Tabasco is ranked higher because its accumulation of degrees is higher, i.e., Tabasco has more red than Splash.

However, a search based on multiple qualities is more complex. In accordance with an embodiment of the present invention, the Advisor can divide the search into multiple searches of single quality. That is, the Advisor interactively searches for items for each quality and gathers the matching items into a list of suggestions. If a matching item is not already included in the list of suggestions, the Advisor adds the item to the list of suggestions. Preferably, the Advisor sorts the list of suggestions by item so it can be quickly located. If the matching item is already on the list, the degree associated with the matching item is added to the current score (i.e., the degrees are accumulated) and the number of matching qualities is incremented by one. When all of the qualities and items have been iterated, the list is re-sorted in descending order based on the number of qualities that were matched and the total accumulated score. For example, if the user searches for something "red" and "yellow," then the Advisor will return "Splash (2,97)" and "Tabasco (1,97)". In this case, the result Splash is ranked higher or is preferred because it has greater number of matching qualities than Tabasco. However, if the user refines the search to now include "red," "yellow" and "bull," the result Tabasco (2,197) will now ranked higher than the result Splash (2,97) because of its higher accumulation of degrees.

In accordance with an embodiment of the present invention, user can limit the scope of any search by specifying the number of qualities to be sampled and the number of items to be sampled within each quality. Preferably, the Advisor also considers the user's profile information, such as user's searching history, in searching for matching items (as discussed in detail herein). Also, the Advisor can limit the search to a certain maximum number of qualities and/or items to ensure that the search does not exceed certain reasonable period of lime. For example, in a large catalog containing hundreds items associated with each quality, it may be preferable for the Advisor to consider only the top N items.

In accordance with an embodiment of the present invention, the user can restrict the search so that the Advisor returns only items matching all of the specified qualities. For example, the Advisor may search for items using the methodologies (or algorithms) described herein for multiple qualities and then removing or filtering the items on the list that do not have all of the specified qualities. In such cases, the Advisor treats the additional qualities associated with the customer profile as optional searching criteria. That is, these optional searching criteria are not used to remove the items from the list but are used to refine or customize the search.

In accordance with another embodiment of the present invention, the user can specify a logical expression in their search to evaluate the qualities of the matching items, thereby permitting the user to specify complex queries. For example, the user can search for products that are "red but not bulls." Preferably, such logical search capabilities are included in Advisor's profile matching methodologies or algorithms.

One of the important factors in building the index is the ability to assign qualities to the items using natural language processing. The Advisor explicitly performs this assignment by adding the qualities directly to the items. For example, the Advisor parses the textual description of the item and converts the parsed textual description to a list of qualities. In accordance with an embodiment of the present invention, the Advisor disregards a standard set of "stop" words and then "stems" the remaining words. It is appreciated that to a person of ordinary skill in the art, the "stop" words mean common words that provide no real descriptive content, i.e. "the", "that", "a", "and", etc. "Stemming" is the process of normalizing words to a root such that they can be more easily searched. For example, the Advisor can stem or reduce the words "reddest", "redder", and "reddish" to its root adjective "red", thereby reducing the number of redundant qualities and increasing the efficiency of the searches. The Advisor can use a public domain stemming algorithm, such as one written by Michael Porter or any other known stemming and language processing techniques.

Alternatively, the Advisor can reduce normalized words to a common synonym, thereby reducing the over-all number of qualities (i.e., reducing the number of redundant qualities) and providing more effective searches.

To maintain the index current, the Advisor takes a snapshot of the qualities associated with a new item to be added to the index. This ensures that the index is properly administered by the Advisor when an item is updated or removed from the index (or system). Updating an item involves the Advisor creating a new list of qualities associated with the item and comparing the list of qualities with the stored list of qualities in ItemQualities 100. Accordingly, the Advisor adds the item to new qualities and removes the item from old qualities. Also, the Advisor may update the position of items in the ItemQualities 100 to reflect any changes in the degree of the qualities associated with the item, thereby enabling the Advisor to properly maintain the reverse index of items. To remove any item from the index, the Advisor traverses the list of qualities and then perform a linear search on each ItemQualities list to find and remove the item from the list.

User Profiling

The Advisor supports user profiling by maintaining a ranked list of qualities that a customer user may be interested in. The profile list is accumulated over time through a process of observation. The Advisor gradually learns the customer's preferences over time through inference. The Advisor converts or translates these customer preferences into qualities, which can be used as default criteria for searching items. There are different methods for gathering these user profile characteristics.

The first approach is to record the qualities that are specified by the user when searching for items, i.e., user's searching history. For example, a customer that searches for "old movies" is likely to enjoy movies and old items, and accordingly such information is recorded by the Advisor for such customer. Each time a user searches on a given quality, the Advisor tracks and records the number of items the user searched for such quality in his/her profile. Preferably, a search list is sorted in descending order such that the most commonly referenced qualities remain high on the list. Preferably, the Advisor continuously updates the search list to reflect user's searching history.

Another approach involves averaging the qualities of items that a user requests additional information. While the customer may not be interested in all of the qualities, it is likely that they are interested in some of qualities for various unrelated reasons. For example, if a customer that searches for "western movies" and "romances" consistently selects movies that are also "old", then the Advisor can infer that this customer also has a preference for "old" movies. Of course, when the customer purchases an "old" movie that is an even stronger indication of such interest. In such cases, the Advisor can learn all of the qualities of the item in question and qualities associated with the customer. The Advisor learns by applying each quality associated with the item to a profile list or information associated with the customer. Over time, the qualities frequently associated with items for all customers or a particular customer move to the top of the profile list, i.e., qualities are ranked or ordered based on their use. Accordingly, the accuracy of the profile list improves with more customers' searching and browsing.

Combining Searching and Profiling

The utilization of the user profile information by the Advisor in searching for item is one of the reasons why the Advisor is such a powerful search engine. As noted herein, the qualities stored in the customer profile are used as secondary criteria by the Advisor to supplement user's search criteria. In accordance with an embodiment of the present invention, the Advisor appends the qualities in the user's profile to the user's search criteria up to the specified maximum. For example, if the maximum depth of five qualities is used for a search, and if a customer specifies two search criteria and there are ten qualities in his/her customer or user profile, then the Advisor appends the top three qualities from the user's profile information to the user's two search criteria. That is, the search is now based on five search criteria encompassing two explicitly user specified qualities and the top of the first three qualities from the customer profile. This enables the Advisor to further rank and narrow the search results to provide more useful and meaningful results to the user

Object Oriented Design and EJB

The Advisor is built on the Enterprise Java Beans (EJB) architecture, as specified in EJB 1.0 Specification, which is incorporated herein in its entirety using the design methodology of the Smart Generator. This design methodology results in the creation of components that are easily customizable and extendable, thereby enabling various EJB methods to be changed, and additional behaviors and properties to be added to the components. For example, this is particularly useful with regard to the get suggestion methods. The developer can extend the implementation of the Suggestions, i.e., the results of the query, to incorporate other sources of data or business logic to perform special analysis of the customer profile. Preferably, the AddItem can be changed such that an object is interrogated for special characteristics and such detected characteristics are then automatically added to the component.

Most of the indices persist in the form of collections of Java classes, thereby making their retrieval very efficient. By taking advantage of the object pooling that is inherent in EJB, the Advisor retains the most commonly searched qualities in its memory, thereby reducing the number of retrievals from persistent storage. Further, the Advisor utilizes a high performance object database to improve its performance.

Figure 2:
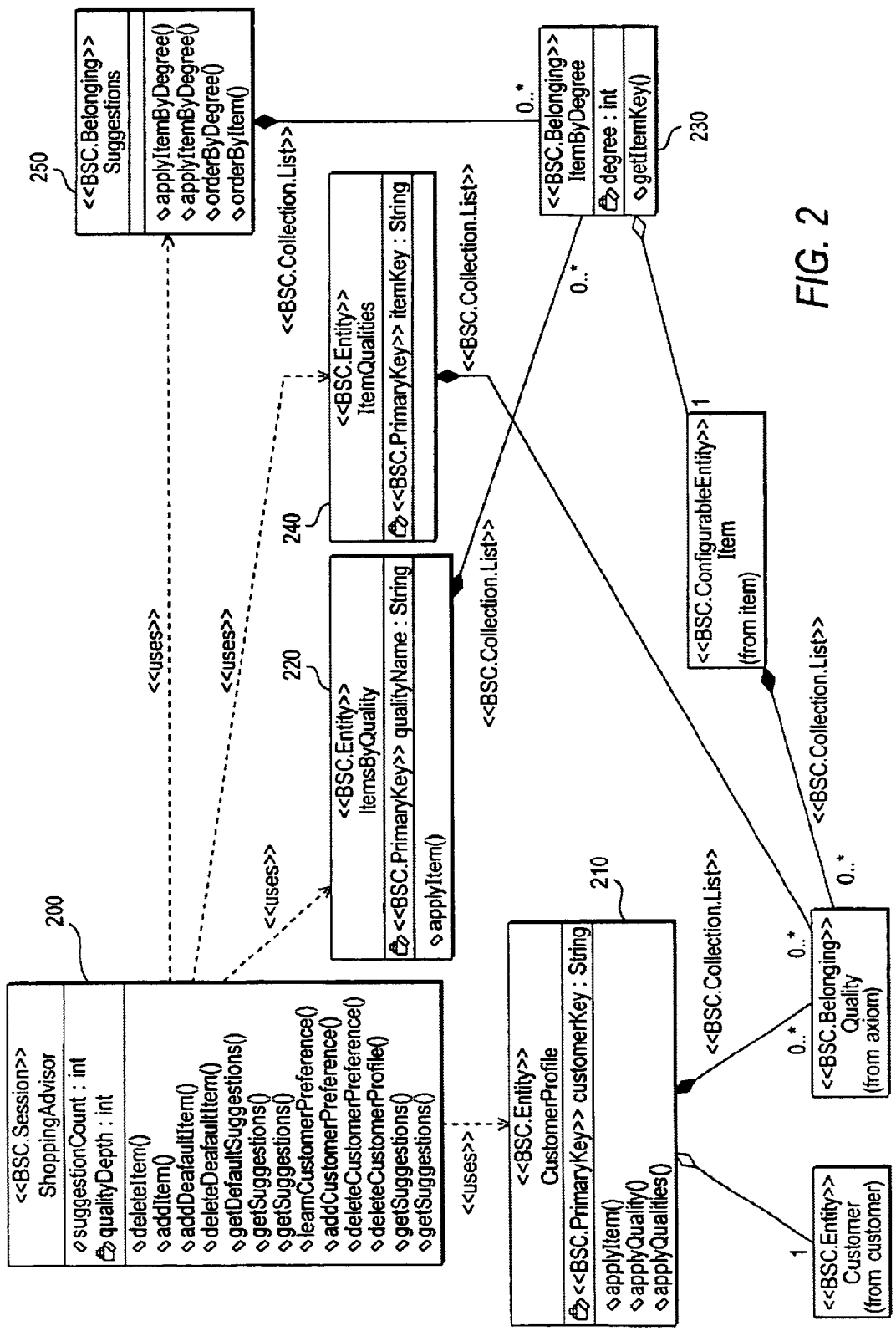
FIG. 2 is a static class diagram of an Advisor of the present invention in UML (Unified Modeling Language).

Turning now to FIG. 2, there is illustrated an UML (United Modeling Language) diagram describing the components of the Advisor in accordance with an embodiment of the present invention. The Shopping Advisor 200 is a Stateflil Session EJB that can be configured for a conversational interaction. Stateful Session Beans is an EJB instance associated with a single chain and possess internal states. Hence, the Stateful Session Beans need to handle Activation and Passivation. Passivation is the process by which the state of a Bean is saved to persistent storage and then is swapped out. Activation is the process by which the state of a Bean is restored by swapping it in from persistent storage. That is, the Shopping Advisor 200 has attributes that can be set once for a session and applied to each invocation of a getSuggestions methods. Also, the Shopping Advisor 200 has attributes to implement the business logic needed to maintain the index of suggestions.

The CustomerProfile 210 is an Entity EJB that maintains the persistent state of a customer's profile. An Entity Bean represents information persistently stored in a database. Entity Beans are associated with database transactions, and may provide data access to multiple users. Since the data that an Entity Bean represents is persistent, Entity Beans survive server crashes (the server can reconstruct the Bean from the underlying data when it comes back online). In relational terms, an Entity Bean might represent an underlying database row, or a single SELECT result row. In an object-oriented database (OODB), an Entity Bean may represent a single object, with its associated attributes and relationships. That is the CustomerProfile 210 maintains a reference to the Customer Entity EJB and a collection of the qualities that that customer has previously shown an interest in.

The ItemsByQuality Entity EJB 220 representing a single entry in an index that maps the qualities to a collection of ItemsByDegrees 230, each of which refers to an item and the degree to which it possesses the quality.

The ItemQualities Entity EJB 240 maintains the snap shot of the qualities to properly maintain the index, as described herein. Results of the search are returned in a Suggestions object 250, which are a collection of individual Suggestion objects and some methods for maintaining that list. Preferably, the Suggestion object is ordered by the number and degree of matching qualities. It is appreciated that one of ordinary skill in the art is knowledgeable about the various EJB classes and methods as detailed in the EJB 1.0 Specification or other Java documentation.

While the present invention has been particularly described with respect to the illustrated embodiment, it will be appreciated that various alterations, modifications and adaptations may be made based on the present disclosure, and are intended to be within the scope of the present invention. It is intended that the appended claims be interpreted as including the embodiments discussed above, those various alternatives, which have been described, and all equivalents thereto.

What is claimed:

1. A computer based method of searching an object database, comprising the steps of:
   inputting at a user computer, search criteria consisting of one or more search terms;
   appending said search criteria with one or more qualities associated with said user from a dynamically updated user profile database, thereby forming an appended search criteria; said user profile comprising qualities representing preferences of said user accumulated over time;
   searching the object database for items based on the appended search criteria, thereby matching the items with the preferences of said user;
   scoring said matching items from said search based on total number of qualities matched and accumulation of degrees; and
   updating user profile qualities after said searching by reordering the ranking of the qualities based on said scoring.

2. The method of claim 1, wherein the step of appending appends a number of qualities associated said user as a function of a predetermined maximum number of qualities for a search.

3. The method of claim 1, wherein the step of searching searches the object database for items matching at least one quality of said search criteria.

4. The method of claim 3, further comprising the step of updating said user profile information with matching items.

5. The method of claim 1, wherein the step of searching searches the object database for items matching all of said qualities of said search criteria.

6. The method of claim 1, wherein each quality is composed of two fields, a string field and a ranking or degree field.

7. The method of claim 1, wherein said object database maintains a reverse index of items.

8. A computer based system for searching an object database, comprising:
   a computer module for receiving from a user computer, search criteria consisting of one or more search terms;
   a computer processor for appending said search criteria with one or more qualities associated with said user from a dynamically updated user profile database, thereby forming an appended search criteria, said user profile comprising qualities representing preferences of said user accumulated over time;
   a computer module for searching the object database for items based on the appended search criteria, thereby matching the items with the preferences of said user;
   a computer module for scoring said matching items from said search based on total number of qualities matched and accumulation of degrees; and
   a computer module for updating user profile qualities after said searching by reordering the ranking of the qualities based on said scoring.

9. The system of claim 8, wherein said module for appending is operable to append a number of qualities associated said user as a function of a predetermined maximum number of qualities for a search.

10. The system of claim 8, wherein said module for searching is operable to search the object database for items matching at least one quality of said search criteria.

11. The system of claim 10, further comprising a module for updating said user profile information with matching items.

12. The system of claim 8, wherein said module for searching is operable to search the object database for items matching all of said qualities of said search criteria.

13. The system of claim 8, wherein each quality is composed of two fields, a string field, and a ranking or degree field.

14. The system of claim 8, wherein said object database maintains a reverse index of items.

* * * * *